United States Patent
Casati et al.

(10) Patent No.: US 7,644,006 B2
(45) Date of Patent: Jan. 5, 2010

(54) SEMANTICALLY INVESTIGATING BUSINESS PROCESSES

(75) Inventors: Fabio Casati, Palo Alto, CA (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1861 days.

(21) Appl. No.: 10/200,306

(22) Filed: Jul. 22, 2002

(65) Prior Publication Data

US 2004/0015378 A1    Jan. 22, 2004

Related U.S. Application Data

(63) Continuation-in-part of application No. 10/177,273, filed on Jun. 21, 2002.

(51) Int. Cl.
*G06F 17/50* (2006.01)
*G06F 7/00* (2006.01)

(52) U.S. Cl. .................................. 705/7; 705/1; 707/1

(58) Field of Classification Search ...................... 705/7
See application file for complete search history.

(56) References Cited

U.S. PATENT DOCUMENTS

| | | | |
|---|---|---|---|
| 5,182,793 A | 1/1993 | Alexander et al. | |
| 5,826,239 A | 10/1998 | Du et al. | |
| 5,870,545 A | 2/1999 | Davis et al. | |
| 5,890,133 A | 3/1999 | Ernst | |
| 5,970,482 A | 10/1999 | Pham et al. | |
| 5,999,911 A | 12/1999 | Berg et al. | |
| 6,006,223 A | 12/1999 | Agrawal et al. | |
| 6,012,051 A | 1/2000 | Sammon et al. | |
| 6,014,673 A | 1/2000 | Davis et al. | |
| 6,041,306 A | 3/2000 | Du et al. | |
| 6,212,526 B1 | 4/2001 | Chaudhuri et al. | |
| 6,236,994 B1 | 5/2001 | Swartz et al. | |
| 6,278,977 B1 | 8/2001 | Agrawal et al. | |
| 6,278,994 B1 | 8/2001 | Fuh et al. | |
| 6,311,175 B1 | 10/2001 | Adriaans et al. | |
| 6,326,962 B1 | 12/2001 | Szabo | |
| 6,339,838 B1 | 1/2002 | Weinman, Jr. | |

(Continued)

FOREIGN PATENT DOCUMENTS

WO    WO 01/73666    10/2001

(Continued)

OTHER PUBLICATIONS

Böhnlein, et al., Business Process Oriented Development of Data Warehouse Structures, in Data Warehousing 2000, Nov. 13, 2000, p. 1-16.*

(Continued)

*Primary Examiner*—Beth V Boswell
*Assistant Examiner*—Justin M Pats (57) ABSTRACT

Systems and methods of semantically investigating business processes are described. In one aspect, execution data that is generated by one or more components of a business process platform is accessed. The data is generated during execution, at each of one or more nodes, of one or more instantiations of one or more business processes each involving a set of one or more activities each defined by a respective service and performed by a respective set of one or more resources. The accessed execution data is mapped into one or more semantic concepts to obtain outcome data. The outcome data is visualized in terms of a user-selected perspective.

37 Claims, 8 Drawing Sheets

U.S. PATENT DOCUMENTS

| | | | |
|---|---|---|---|
| 8,631,362 | | 10/2003 | Ullman et al. |
| 6,671,693 | B1 * | 12/2003 | Marpe et al. ............... 707/102 |
| 2001/0053991 | A1 | 12/2001 | Bonabeau |
| 2001/0054032 | A1 | 12/2001 | Goldman et al. |
| 2002/0107824 | A1 | 8/2002 | Ahmed |
| 2002/0174093 | A1 | 11/2002 | Casati et al. |
| 2003/0123640 | A1 * | 7/2003 | Roelle et al. ........... 379/265.06 |
| 2003/0236677 | A1 | 12/2003 | Casati et al. |
| 2003/0236689 | A1 | 12/2003 | Casati et al. |
| 2003/0236691 | A1 | 12/2003 | Casatl et al. |
| 2004/0015381 | A1 * | 1/2004 | Johnson et al. ................ 705/8 |

FOREIGN PATENT DOCUMENTS

| | | |
|---|---|---|
| WO | WO 01/75747 | 10/2001 |
| WO | WO 02/05154 | 1/2002 |

OTHER PUBLICATIONS

Reddy et al., Data Warehouse Architecture for Army Installations, US Army Corps of Engineers, Engineer Research and Development Center, Nov. 1999.*

Jarke, et. al., Architecture and Quality in Data Warehouses: An Extended Repository Approach, 1999.*

Wojciechowski, Mining various patterns in sequential data in a SQL-like manner, Proc. of short papers of the 3rd East European Conference on Advances in Databases and Information Systems (ADBIS'99), Maribor, Slovenia, Sep. 13-16, 1999.*

Bouzeghoub, et al., Modeling Data Warehouse Refreshment Process as a Workflow Application, Proceedings of the International Workshop on Design and Management of Data Warehouses (DMDW'99), Jun. 14-15, 1999.*

Miller, et al., Object-oriented data warehouse for information fusion from heterogeneous distributed data and knowledge sources, Information Technology Conference, 1998, IEEE, Sep. 1-3, 1998, p. 27-30.*

Miller et al., Object-oriented Data Warehouse for Information Fusion from Heterogeneous Distibuted Data and Knowledge Sources, 1998, p. 27-30.*

Huang et al., Developing an Active Data Warehouse System, Department of Information Management, National Chung Cheng University, 2000, p. 1-8, http://cmca.mis.ccu.edu.tw/dblab/published/2000/046.pdf.*

Schwartz, Companies Spin Personalized Portals To Their Advantage—Technology Improvements Provide Portals for Every Taste and Job Requirement, Information Week, Jul. 3, 2000.*

Businessobjects.com, Product Press Release—Business Obejcts Launches BusinessObjects Customer Intelligence, Jul. 10, 2001.*

Nasukawa, Text analysis and knowledge mining system, IBM Systems Journal, vol. 40, No. 4, 2001, p. 967-84, accepted for publication Jun. 26, 2001.*

Hahn et al., Automatically Generating OLAP Schemata from Conceptual Graphical Models, Proceedings of the 3rd ACM International Workshop on Data Warehousing and OLAP, Nov. 2000.*

Corvu.com, Corvu CorManage, Balanced Scorecard, Apr. 4, 2001, http://web.archive.org/web/20010401019/www.corvu.com/products/cormanage.html.*

Hernandez et al., Clio: A Semi-Automatic Tool For Schema Mapping, ACM SIGMOD 2001, May 21-24, Santa Barbara, CA, USA.*

Miller et al., The Clio Project Managing Heterogenity, SIGMOD Record, vol. 30, No. 1, Mar. 2001.*

Sayal et al., Business Process Cockpit, Software Technology Laboratory, HP Laboratories Palo Alto, HPL-2001-313, Nov. 28, 2001.*

Sayal et al., Semantic Analysis of E-Business Operations, Software Technology Laboratory, HP Laboratories Palo Alto, HPL-2002-176, Jun. 18, 2002.*

Bonifati et al., Warehousing Workflow Data: Challenges and Opportunities, Proeedings of the 27th VLDB Conference, Roma, Italy, Sep. 11-14, 2001.*

Casati et al., An Open Flexible, and Configurable System for Service Composition, Hewlett-Packard Labs, 1-U4, 2000.*

Casati et al., Semantic Analysis of Business Executions, HP Laboratories Palo Alto, HPL-2001-328, Dec. 17, 2001.*

Casati, Intelligent Process Data Warehouse for HPPM 5.0, HP Laboratories Palo Alto, HPL-2002-120, Apr. 26, 2002.*

Miller et al., Schema Mapping as Query Discovery, Proceedings of the 26th VLDB Conference, Cairo, Egypt, Sep. 10-14, 2000.*

Cody et al., The integration of business intelligence and knowledge management, IBM Systems Journal, vol. 41, No. 4, 2002, accepted for publication Jul. 12, 2002.*

Tryfona et al., starER: A Conceptual Model for Data Warehouse Design, DOLAP 99 Kansas City Mo USA, Nov. 6, 1999.*

Alavi et al., Review: Knowledge Management and Knowledge Management Systems: Conceptual Foundations and Research Issues, MIS Quarterly vol. 25, No. 1, p. 107-36, Mar. 2001.*

Casati et al., Semantic Workflow Interoperability, In Proc. Of the 5th Conf. on Extending Database Technology (EDBT), 1996, p. 443-62.*

Terje Jensen et al., "Managing Quality of Service in Multi-Provider Environment," Telecomm'99, pp. 1-8 (1999).

Fabio Casati et al., "Process Automation as the Foundation for E-Business," Proceedings of the 26th International Conference on Very Large Databases, Cairo, Egypt, 2000, pp. 688-691.

Larry Wong, "e-Services: A Key Component for Success," eAI Journal, pp. 18-25, Mar. 2001.

Lisa Cingiser DiPippo et al., "Expressing Quality of Service in Agent Communication," Proceedings of the 2001 International Conference on Artificial Intelligence, Las Vegas, Nevada, Jun. 2001.

Angela Bonifati et al., "Warehousing Workflow Data: Challenges and Opportunities," Proceedings of the 27th VLDB Conference, Roma, Italy (Sep. 2001).

Daniela Grigori et al., "Improving Business Process Quality through Exception Understanding, Prediction, and Prevention," Proceedings of the 27th VLDB Conference, Roma, Italy (Sep. 2001).

"HP Process Manager White Paper," Hewlett-Packard Company (Oct. 30, 2001).

Umeshwar Dayal et al., "Business Process Coordination: State f the Art, Trends, and Open issues," Proceedings of the 27th VLDB Conference, Roma, Italy (Sep. 2001).

Jon S. Sjolie, "WebSphere Business Process Integration," IBM Software Group (Nov. 2001).

Lowe, et al., Implementing the capability maturity model for software development, Aug. 1996, Hewlett-Packard Journal, vol. 47, No. 4.

Xie et al., Object Oriented Software Quality Evaluation Technology, Jul. 2000, Technical Report, Software Quality Evaluation Group.

Wilson, et al., Automated Quality Analysis of Natural Language Requirement Specifications, Oct. 1996, http://satc.gsfc,nasa.gov/support/ PNSQC_OCT96/pnq.PDF.

* cited by examiner

SEMANTICALLY INVESTIGATING BUSINESS PROCESSES

CROSS-REFERENCE TO RELATED APPLICATIONS

This application is a continuation-in-part of co-pending U.S. patent application Ser. No. 10/177,273, filed Jun. 21, 2002.

This application relates to the following co-pending applications, each of which is incorporated herein by reference: U.S. patent application Ser. No. 09/860,230, filed May 17, 2001, by Fabio Casati et al. and entitled "Method of Identifying and Analyzing Business Processes from Workflow Audit Files;" U.S. patent application Ser. No. 10/177,273, filed Jun. 21, 2002, Fabio Casati et al., and entitled "Investigating Business Processes;" U.S. patent application Ser. No. 10/176,505, filed Jun. 21, 2002, by Fabio Casati et al. and entitled "Improving Business Processes;" U.S. patent application Ser. No. 10/177,423, filed Jun. 21, 2002, by Fabio Casati et al. and entitled "Analyzing Decision Points In Business Processes."

TECHNICAL FIELD

This invention relates to systems and methods of investigating business processes.

BACKGROUND

E-business is transforming corporations, markets, and the global economy. The conduct of business over Internet (e.g., buying, selling, servicing customers and collaborating with business partners) is affecting how business transactions are performed. Today, web interfaces allow customers to easily find products, services, providers and suppliers that they need, compare prices and qualities, and trade, buy, and get products and services delivered quickly. Customers may be presented with user-friendly graphical interfaces, targeted advertisements, up-to-date product catalogues, and personalized stores. The web facade, however, hides inefficiencies, manual and error-prone operations, and slow, complex, inflexible, and unmanageable systems. Indeed, in many e-business applications, the execution of business processes involves a substantial amount of human intervention in several aspects of business process execution, such as (repeated) data entry, process execution monitoring (a process that often requires tracking each process over several systems in order to find out its current advancement state), exception handling, and scheduling of process activities.

As a result, process design, automation, and management technologies are being used in both traditional and newly-formed, Interned-based enterprises in order to improve the quality and efficiency of their administrative and production processes, to manage electronic commerce (or e-commerce) transactions, and to rapidly and reliably deliver services to businesses and individual customers.

Inefficiencies in e-business processes impose high operating costs that are strongly affecting the profits of many e-business entities. To compete successfully, enterprises are demanding effective ways to implement e-business and deliver e-services over the Internet. In addition, in order to attract and retain customers as well as business partners, organizations also need to provide their services (i.e., execute their processes) with a high, consistent, and predictable quality. In general, in order to deliver such quality, business processes should be designed correctly, their execution should be supported by a system that can meet workload requirements, and the (human or automated) process resources should be able to perform their work items in a timely fashion.

SUMMARY

The invention features systems and methods of semantically investigating business processes.

In one aspect, the invention features a method of investigating a business process in accordance with which execution data that is generated by one or more components of a business process platform is accessed. The data is generated during execution, at each of one or more nodes, of one or more instantiations of one or more business processes each involving a set of one or more activities each defined by a respective service and performed by a respective set of one or more resources. The accessed execution data is mapped into one or more semantic concepts to obtain outcome data. The outcome data is visualized in terms of a user-selected perspective.

The invention also features a system and a computer program for implementing the above-described method of business process investigation.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Referring to FIG. 1, in one embodiment, a service provider 10 may deliver one or more services to customers 12, 14 and employees 16, 18 over a global communication network 20 and a service provider network 22. In order to deliver such services, service provider 10 executes processes and functions that may require the use of several resources and the invocation of other services, possibly offered by one or more remote service providers 24. For example, to deliver an e-procurement service, service provider 10 may invoke (web or traditional) services provided by suppliers, warehouses, and shipment companies, as well as services provided by internal (human or automated) resources, such as administrative employees, ERP (Enterprise Resource Planning) systems, Java beans, implementation of WSDL (Web Service Description Language) services, and printers.

Figure 1:
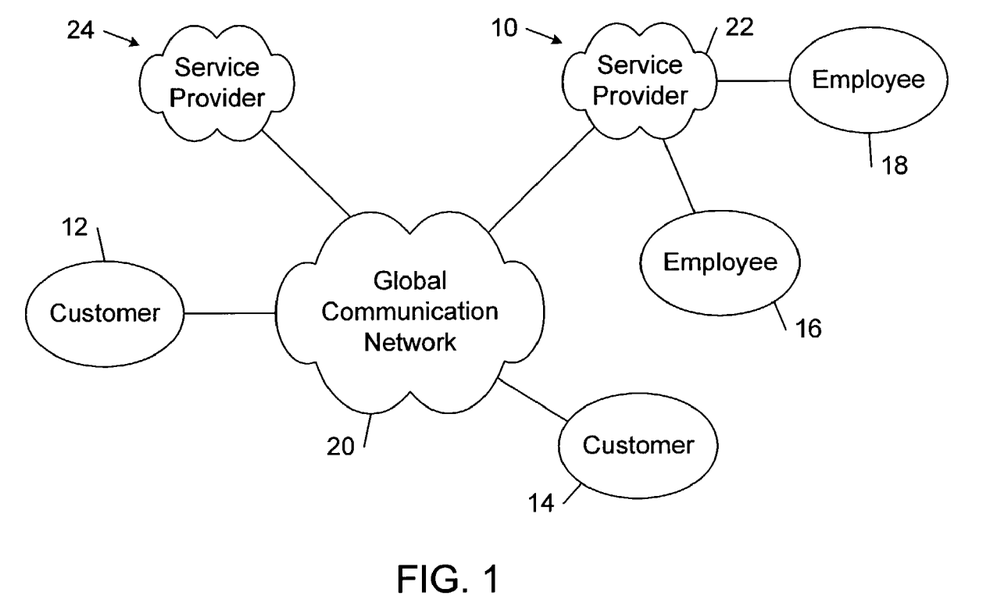
FIG. 1 is diagrammatic view of an e-business driven infrastructure that includes service providers, customers and employees that are interconnected by a global communication network.

Global communication network 20 may include a number of different computing platforms and transport facilities, including a voice network, a wireless network, and a computer network. Service requests may be transmitted, and service replies may be presented in a number of different media formats, such as voice, Internet, e-mail and wireless formats. In this way, customers 12, 14 may access the services provided by service provider 10 using any one of a wide variety of different communication devices. For example, in one illustrative implementation, a wireless device (e.g., a wireless personal digital assistant (PDA)) may connect to service provider 10 over a wireless network. Communications from the wireless device may be in accordance with the Wireless Application Protocol (WAP). A wireless gateway converts the WAP communications into HTTP messages that may be processed by service provider 10. In another illustrative implementation, a voice device (e.g., a conventional telephone) may connect to service provider 10 over a voice network. Communications from the voice device may be in the form of conventional analog or digital audio signals, or they may be formatted as VoxML messages. A voice gateway may use speech-to-text technology to convert the audio signals into HTTP messages; VoxML messages may be converted to HTTP messages based upon an extensible style language (XSL) style specification. The voice gateway also may be configured to receive from service provider 10 real time audio messages that may be passed directly to the voice device. Alternatively, service provider 10 may transmit formatted messages (e.g., VoxML, XML, WML, e-mail) that must be converted to a real time audio format (e.g., using text-to-speech technology) before the messages may be passed to the voice device. In a third illustrative implementation, a software program operating at a client personal computer (PC) may access the services of service provider 10 over the Internet.

Figure 2:
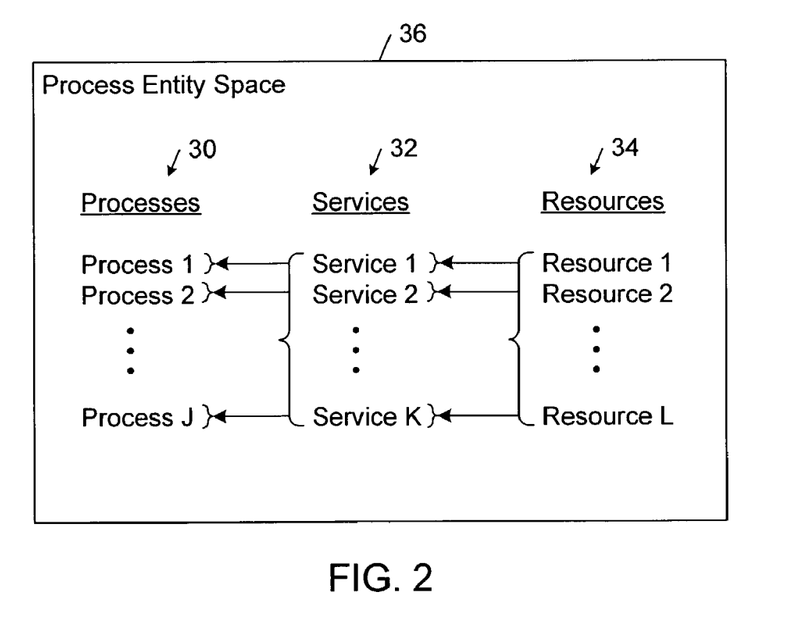
FIG. 2 is a diagrammatic view of a process entity space.

Referring to FIG. 2, the services provided by service provider 10 may be built from a collection of business process entities, including processes 30, services 32, and resources 34. In particular, any given service may be defined by a directed graph of business processes 30. Each process 30 is operable to invoke one or more services 32 for carrying out a specified activity. Each service 32 specifies the way in which a particular activity should be performed. Each service 32 is operable to invoke one or more resources 34, each of which performs an activity in accordance with the service specification. Each resource 34 may be invoked by one more services 32, and each service 32 may be invoked by one or more processes 30. In the context of process entity space 36, each business process 30 may be visualized along multiple dimensions and multiple levels of granularity based upon the mappings between the business process and its associated services and resources.

Figure 3:
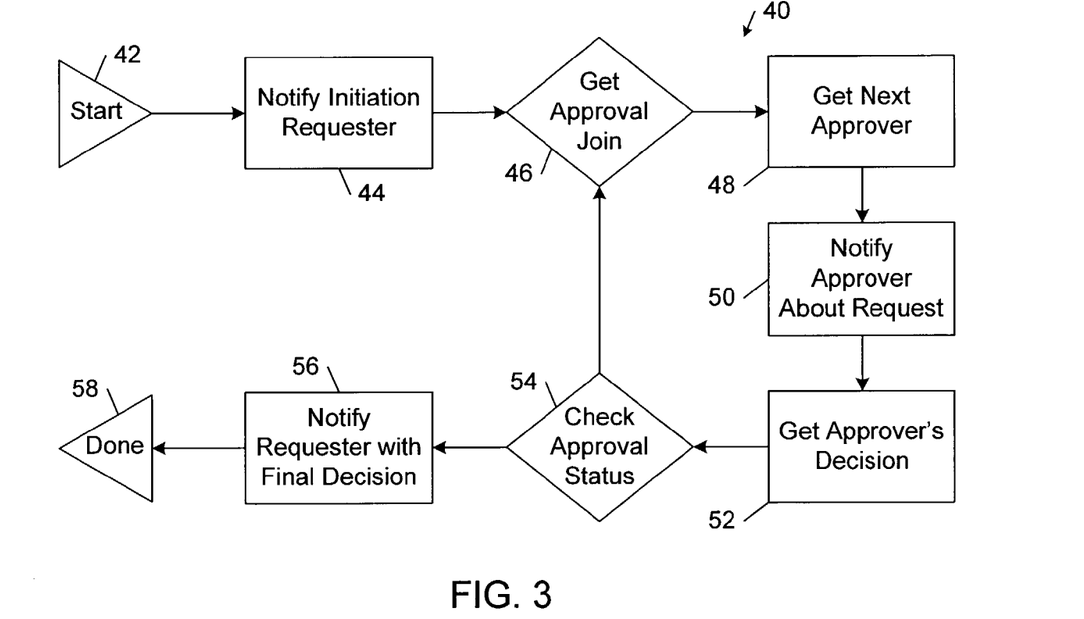
FIG. 3 is a workflow diagram of an expense approval process.

As shown in FIG. 3, a business process may be modeled as a directed graph 40 having different types of nodes, including for example work nodes, route nodes, start nodes, and completion nodes. A work node represents the invocation of a service (or activity). Each work node is associated with a service description that defines the logic for selecting a resource or resource group to be invoked for executing the work. The service definition also identifies the data items to be passed to the resource upon invocation (e.g., execution parameters or input data) and to be received from the resource upon completion of the work (e.g., status values, output data). Several work nodes may be associated to the same service description. Route nodes are decision points that control the execution flow among nodes based on a routing rule. A start node denotes the entry point to the process, and completion nodes denote termination points. A process definition may be instantiated several times and multiple instances may be concurrently active. Activity executions may access and modify data included in a case packet. Each process instance has a local copy of the case packet.

As used herein, the term "service" refers broadly to any functionality invoked during the execution of a process or function, independent of the technology that is used to deliver it. A service may be composed of a single atomic activity to be executed by a human or automated resource. Alternatively, a directed graph that is composed of a combination of work nodes and decisions may be referred to as a service. The term "service" permits a convenient reference by name to a specific graph of activities and decisions without re-iterating these individual components. In this way, the series of activities may be invoked by referring to the service instead of the component sequence of tasks. The introduction of services enables a single definition to be re-used multiple times within the same process or in multiple processes. Thus a service may be used multiple times by a given process or by more than one process.

In the embodiment illustrated in FIG. 3, graph 40 models an expense approval process. The process begins in start node 42 with the requester. The case packet data (i.e., the data variables declared for this process) for the expense approval process may include, for example, the identity of the requester, the expense amount, the reasons, and the names of the individuals that should evaluate the request. Once the process is initiated, the requester is notified in work node 44. Work node 44 may invoke another service for notification. For example, notification may be performed by the service send_email. Upon invocation of the send_email service, an email is sent to the requester with notification that the process has begun. The process loops among the list of individuals until either all of the approvers approve the expense request or one of the approvers rejects the expense request (nodes 46-58). (Join 46 is an OR join that fires whenever any input fires.) The final decision is reported to the requester in work node 56 before the process terminates at completion node 58.

Work nodes are associated to services. At run time, when a work node is executed, the associated service (that characterizes the function to be performed) is dispatched to internal or external resources (e.g., an employee, a computer system within the domain of service provider 10, or an application operated by another business entity). The appropriate resources may be selected by a resource broker (also called resource executive) based upon business logic that may be included as part of the process definition, work node definition, or system configuration. A service typically is identified by a name (e.g., approve_request) and by a set of data items (e.g., the name of the requester, the purpose of the request, and the amount of money required to fulfill the request). The work may be dispatched in several different ways. For example, the work item (i.e., a service instance along with specific values of the parameters) may be inserted into a resource work list, in which case resources log into the system to retrieve work items. In other approaches, a process automation system sends work items to the selected resources, in which case resources are presented with a set of work items to be performed when the resources access their work lists. A resource may select one or more items from the work list, execute the selected items, and return the result to the process automation system.

Figure 4:
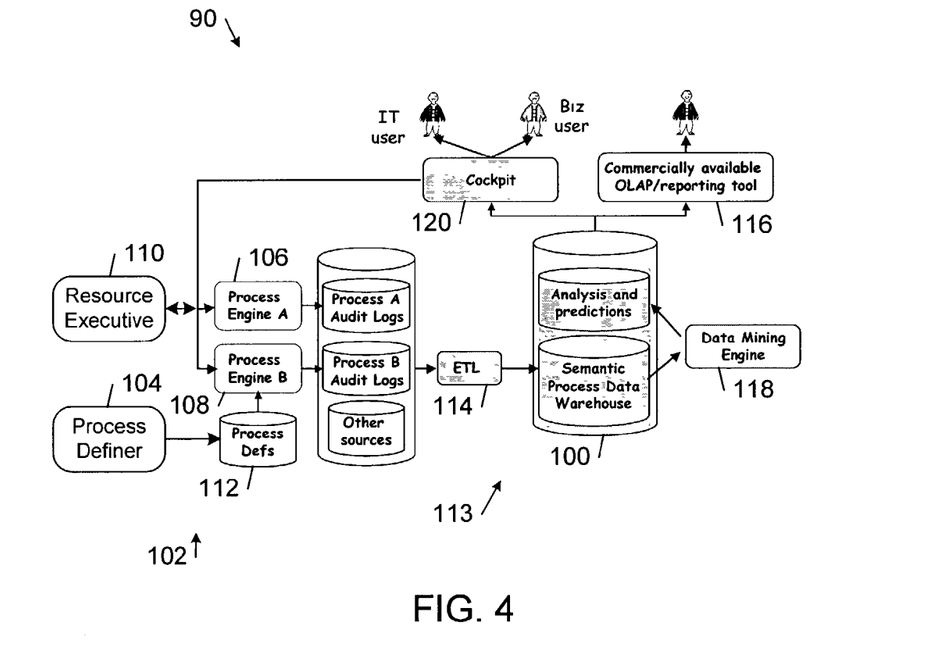
FIG. 4 is a block diagram of internal components of a business management system.

Referring to FIG. 4, a business process management system 90 includes a business process automation tool 102 (e.g., an HP Process Manager, available from Hewlett-Packard Company of Palo Alto, Calif., U.S.A.) comprising a process definer 104, one or more process engines 106, 108, and a resource executive 110. Process definer 104 defines processes as a collection of nodes, services, and input and output parameters. The process definitions are stored in a database 112. Database 112 may contain, for example, a process definition that includes a start node, a completion node, work nodes, route nodes, and services to be invoked by the process. A process definition also includes an indication of the way in which the nodes are interconnected. Process engines 106, 108 execute processes by scheduling nodes to be activated. When a work node is activated, process engines 106, 108 retrieve the associated service definition and resource assignment rule. The resource assignment rule is communicated to the resource executive 110, which identifies one or more resources (e.g., a specific vendor, employee, or piece of equipment) that should execute the service. During execution of processes, process engines 106, 108 step through the process definitions to determine which activities should be performed next, and use the resource executive 110 to assign a resource (or resources) to the activities. Process engines 106, 108 send activity requests and any data needed to perform the activities to the resources identified by the resource executive 110. When the activity is completed, the process engines 106, 108 refer to the process definitions to determine the next nodes to be activated.

Business process management system 90 also includes a business operation intelligence engine 113 that is implemented as a set of tools that support the monitoring, analysis, and management of business operations. Referring again to FIG. 6, in the illustrated embodiment, business operation intelligence engine 113 includes an extract, transfer, and load (ETL) application 114, a data warehouse 100, a data mining engine 118, and a business process cockpit 120.

The ETL application 114 collects data from the audit logs and loads the data into business process data warehouse 100. ETL application 114 performs conventional warehousing functions, such as data cleaning, and formats the process execution data into a predefined record format. Additional details relating to the structure and operation of the business process data warehouse 100 and ETL application 114 may be obtained from U.S. patent application Ser. No. 09/860,230, filed May 17, 2001, by Fabio Casati et al. and entitled "Method of Identifying and Analyzing Business Processes from Workflow Audit Files," and Angela Bonifati et al., "Warehousing Workflow Data: Challenges and Opportunities," Proceedings of VLDB'01, Rome, Italy (September 2001), each of which is incorporated herein by reference. Data in the business process data warehouse 100 may be accessed directly with a commercial reporting tool 116 (e.g., Crystal Reports, available from Crystal Decisions, Inc. of Palo Alto, Calif., U.S.A., and Oracle Discoverer available from Oracle Corporation of Redwood Shores, Calif.). In addition, a data mining tool 118 may apply data mining techniques on top of business process data warehouse 100 to assist analysts in identifying the causes of high and low-quality executions and deriving prediction models that may be used at run-time to predict process execution quality for running processes.

The business process cockpit (BPC) 120 enables a user to investigate a business process by supporting real-time monitoring, analysis, management, and optimization of business processes running on top of the business process automation tool 102. Business process cockpit 120 provides a graphical user interface through which users may apply data warehousing and data mining techniques to business process execution data. As explained in detail below, business process cockpit 120 allows business and IT users to analyze data contained in business process data warehouse 100 according to multiple perspectives. The business process cockpit 120 is designed to make it easy for (non-technical) users to define a wide range of queries and, more generally, of analysis and quality criteria, without writing any code. The information is presented in an intuitive and direct format, so that users may easily and immediately get the information they need. In addition, business process cockpit 120 is configurable according to the needs and preferences of different users. Business process cockpit 120 also monitors processes, services, resources, and other process-related entities, and inform users of actual or foreseen quality degradation. Business process cockpit 120 also may send notifications to users on the medium of their choice. Business process cockpit 120 is operable to manage running processes by tuning process and system configuration parameters (such as the process priority) and by notifying events to processes.

Figure 5:
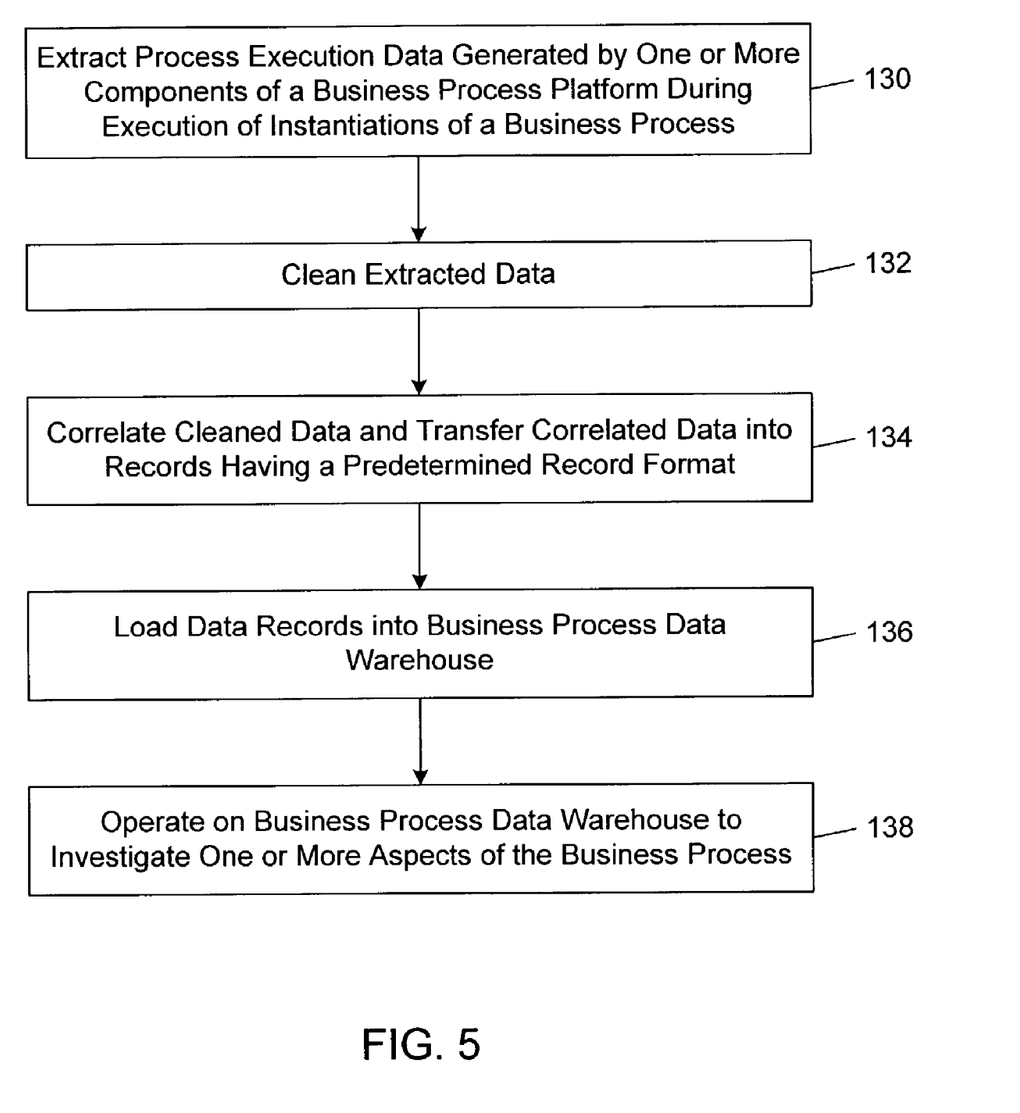
FIG. 5 is a flow diagram of a method of investigating a business process.

Referring to FIG. 5, in one embodiment, a user may operate the business operation intelligence engine to investigate a business process as follows. Initially, the business operation intelligence engine 113 extracts process execution data that is generated by one or more components of the business process platform during execution of instantiations of the business process (step 130). The extract, transfer and load application 114 cleans the extracted data, for example, in accordance with a conventional data warehouse data cleaning process (step 132). The cleaned data is correlated across multiple business process platform components for each business process instantiation, and the correlated data is transferred into records having a predetermined record format (step 134). The data records are loaded into business process data warehouse 100 (step 136). Next, business operation intelligence engine 113 operates on business process data warehouse 100 to investigate one or more aspects of the business process (step 138).

Figure 6A:
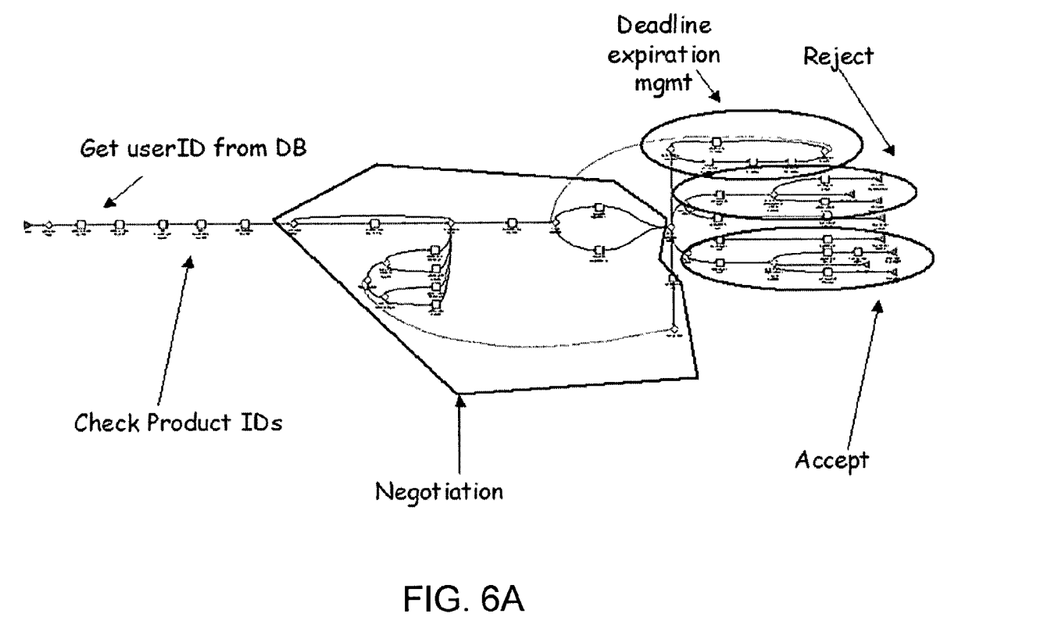
FIG. 6A is a workflow diagram of a purchase order management process.

Referring to FIG. 6A, in one illustrative example, an actual implementation of a purchase order management process, representing a process executed by a supply chain hub to support negotiations of purchase order requests between buyers and sellers, may include a large number of nodes. At each node, one or more processes may be initiated to take care of detailed issues that must be considered in real-life operations, such as getting information from the database, checking permissions, or managing deadlines. In general, an investigation of the nodes of the purchase order management workflow diagram of FIG. 6A might provide statistics based on the actual process; however, such information likely would include cryptic node names with no apparent relation to a conceptualization of the process that would be more easily understood by a business analyst. Indeed, the relationship between such a conceptualization and the actual process might only be known to the information technology personnel who implemented the process, and this knowledge might be spread among different persons.

Figure 6B:
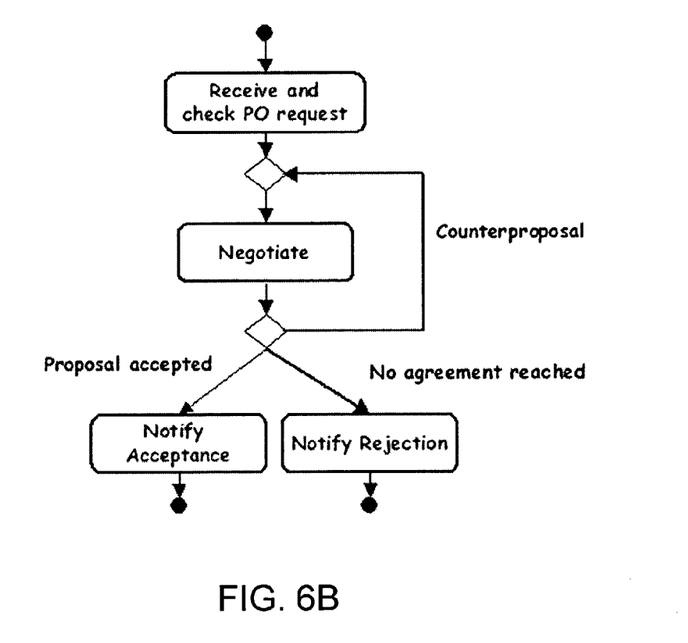
FIG. 6B is a workflow diagram of conceptualized version of the purchase order management process of FIG. 8A.

As shown in FIG. 6B, in one illustrative example, the nodes of the purchase order management process of FIG. 6A may grouped logically to obtain a conceptual, "business-level" view of the process. This is typically at the level of abstraction that business managers have in mind when reasoning about the process. By grouping nodes into logical "process regions" (e.g., Negotiation,Accept, Reject and Deadline Expiration Management), a business analyst may readily obtain meaningful statistics on the process, such as how long it takes to execute each "conceptual" step on average, how many orders are accepted for each week, and the like, as opposed to getting statistics on low-level details, which typically is meaningless for business people. In general, a process region is a part of a process that may be treated as a unit from a business analysis perspective. Process regions serve to bridge the gap between a conceptual view of a process and the actual (implemented) process, which typically includes many nodes at each conceptual step. In some embodiments, process regions may be defined by selecting the starting node s and a set of ending nodes E in an underlying process P. In these embodiments, at most one node e in E may be a non-terminal node of P (i.e., a node with no output arcs). Process regions should satisfy certain constraints. In particular, s and E must identify a subgraph SG of P, such that:

1. s has only one input arc, and this arc comes from a node outside SG;
2. The only node e in E who is a non-terminal node of P has only one output arc a, that connects e to a node that does not belong to SG;
3. Every other arc in SG must only connect nodes in SG.

After a process region has been defined, business operation intelligence engine 113 may provide reports that include region-level statistics. For example, with respect to the example of FIG. 6B, process regions may be defined to analyze steps "Notify Acceptance" and "Notify Rejection" and obtain reports about these regions. It is noted that, in some business process definitions, nodes of two or more conceptual steps (e.g., the nodes that implement steps "Check PO" and "Negotiation" in the example of FIG. 6B) may be intermingled, in which case a clear division into process regions may not be possible for those steps.

Figure 7:
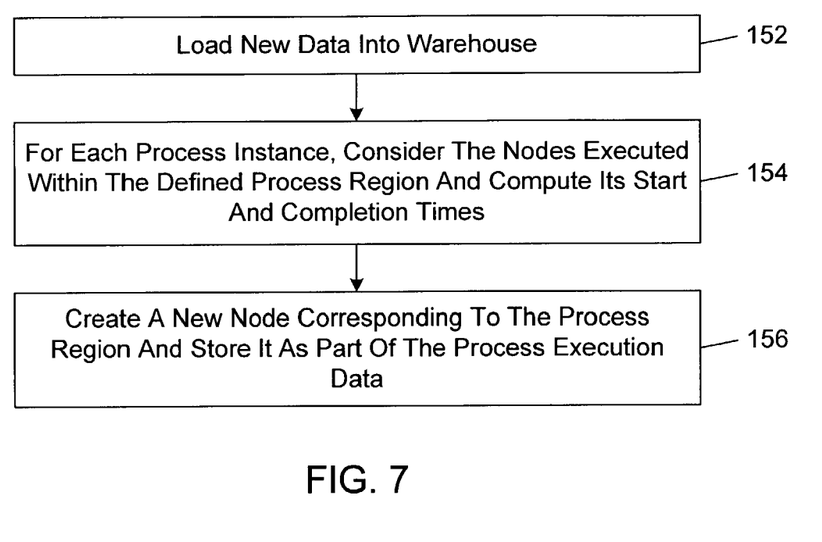
FIG. 7 is a flow diagram of a method of computing a process region.

Referring to FIG. 7, in some embodiments, the business operation intelligence engine 113 may compute a process region and statistics about a process region as follows. New data is loaded into the data warehouse (step 152). For each process instance, the business operation intelligence engine considers the nodes that are executed within the defined process region and computes the start and completion times for those nodes (step 154). A new node corresponding to the defined process region is created and stored as part of the process execution data (step 156).

Figure 8:
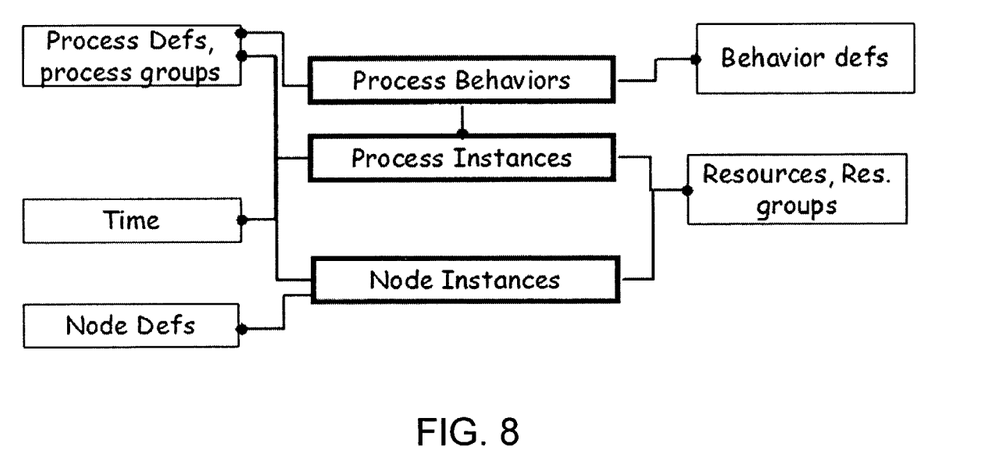
FIG. 8 is a diagrammatic view of a process data warehouse schema.

As shown in FIG. 8, in some embodiments, outcome data that is generated from mapping execution data into one or more semantic concepts may be collected into a process data warehouse database 100. In some embodiments, this database is structured according to a star schema design, where data are described in terms of outcomes (i.e., facts, or happenings of interest to be analyzed) and perspectives under which the outcomes are analyzed (also called the dimensions of the data warehouse). A design based on a star schema enables the analysis of facts to be seen from different perspectives and allows the use of many query optimization techniques. In the illustrated embodiment, the process data warehouse includes the following outcomes: Process instance executions, Node instance executions, and Behaviors. These outcomes may be analyzed based on the following dimensions:

Processes and process groups, to focus on outcomes related to a specific process definition, or to processes within a process group.

Nodes, to focus on outcomes related to a specific process node or set of nodes.

Resources, to focus on processes started by, nodes assigned to, or node executed by a specific human or automated resource or group of resources.

Time, to focus on outcomes that occurred in a certain (fiscal or calendar) time window, or on specific days, weekdays, or hours of the day.

Behaviors, to focus on instances that exhibited a user-defined behavior of interest (details on behaviors are provided below).

In addition, process data warehouse may include a large set of views on top of outcomes and perspectives that make it easy for users to retrieve key statistics and performance metrics, without having to write complex queries. In some embodiments, the process data warehouse also may include pre-packaged configuration files for many commercial reporting tools, so that users may access business reports without writing any code.

Figure 9:
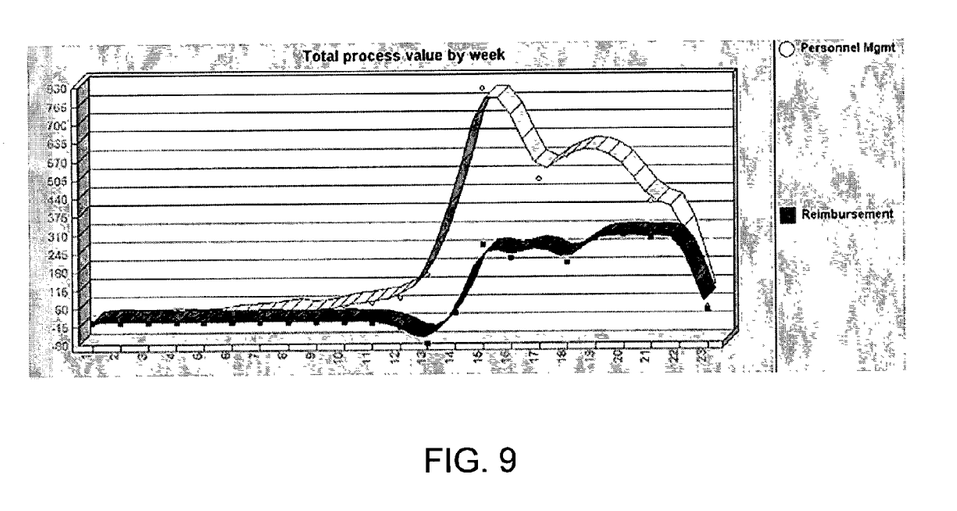
FIG. 9 is a graphical user interface visualizing a distribution of process instances within the categories of a duration taxonomy.

As shown in FIG. 9, in some embodiments, business operational engine 113 may be configured to identify process instances that exhibit specific behaviors, and to understand the causes of such behaviors. Examples of behaviors that might be of interest are Supply Chain process instances that last more than 20 days or include more than 3 negotiation cycles, Claim Management instances in which node "Examine expenses" was executed by a manager, or processes instances related to order for goods over $20,000. The process data warehouse approach is agnostic about the behaviors that users may be interested in analyzing. Indeed, it allows users to define the behaviors to be monitored. The business operational engine 113 then will identify the process instances that exhibit a specific behavior and provide an analysis of those process instances. The concept of behaviors may be used for a wide variety of purposes. This approach simplifies a user's interaction with the system because the user may use the notion of behaviors to intuitively configure a wide variety of different analysis and monitoring functionalities.

In some embodiments, behaviors may be defined by instantiating behavior templates. A template is a parametric definition of a behavior, such as "Instances of process P that takes more than N days to complete." In order to define a behavior of interest for a specific process definition, users may simply instantiate the corresponding template (i.e., provide values for the template parameters). In this approach, no coding is needed. Multiple specific behaviors to be monitored (on the same or different processes) may be defined for each behavior type, and a process may be analyzed for multiple behaviors. Behavior templates are (conceptually) defined by Boolean conditions over process and node execution data available in the warehouse. In some embodiments, templates may be implemented by means of SQL statements that detect behaviors of interest when data are loaded into the warehouse. The SQL query has the only constraint that it must enter tuples into a behavior table that associates process instance identifiers wit behavior identifiers, thereby associating behaviors to processes.

Figure 10:
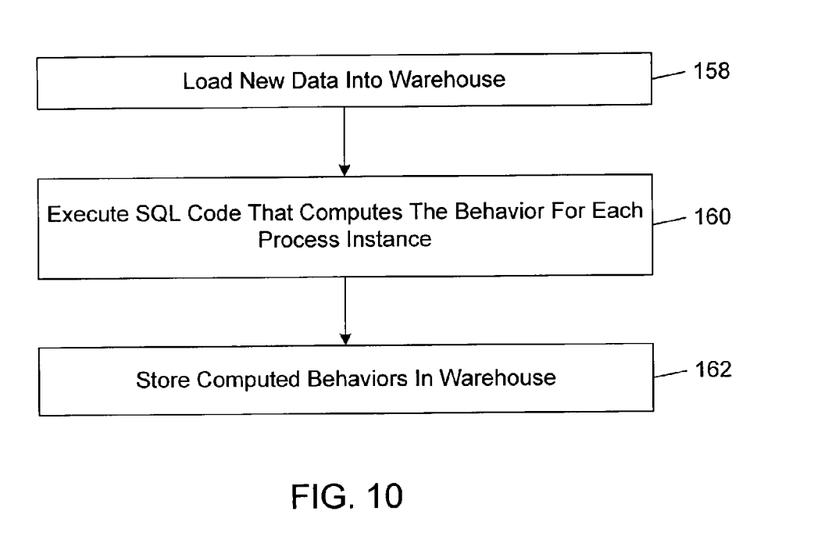
FIG. 10 is a flow diagram of a method of computing a behavior.

Referring to FIG. 10, in some embodiments, the business operation intelligence engine may compute behaviors as follows. New data is loaded into the data warehouse (step 158).

The business operation intelligence engine executes the SQL code that computes the behavior for each process instance (step 160). The computed behaviors then are stored in the data warehouse (step 162).

The process data warehouse may include a large set of predefined behavior templates to account for the most common monitoring and analysis needs. Users may add new behavior templates by downloading them from template libraries, which may be made available on the web. If users need to monitor a kind of behavior that is neither among the predefined ones nor downloadable from web template libraries, they can still specify the behavior template they need, although in this case they would need to define the corresponding condition (and consequently the SQL statement that detects whether an instance has a behavior of a given type). The occurrence of a behavior may be stored as an outcome in the process data warehouse so that processes also may be analyzed from the behavior perspective.

By detecting behaviors of interest, analysts may perform multidimensional analysis to understand the causes of "good" and "bad" process executions, and take actions accordingly. For example, correlations among behaviors, such as which other behaviors occur when a process instance has a behavior B1, may be examined. In this way, the effects of B1 on the process may be analyzed. For example, the analyst may define B1 as processes that are "started by John Smith" and B2 as processes being "too slow." Behavior analysis may be used first to examine how many processes are "too slow" (say, 15%), and then to examine how many processes among those "started by John Smith" are "too slow" (say, 55%), thereby indicating a cause-effect relationship between John Smith and the process being slow.

Process data warehouse analysts also may associate a value (or cost) to behaviors to denote the associated benefit or cost. For example, it is possible to say that the fact that when a certain node in a process execution is performed by a unit manager, then a value (cost) of −3 is assigned to the process instance. When the same node is performed by a department manager, then a value (cost) of −2 is assigned, and so on. In this way it is possible to get reports about the combined value (cost) of a set of process executions. For example, the chart of FIG. 9 may be generated by accessing a process data warehouse view with a reporting tool (e.g., Oracle Discoverer) and visualizing the total process value (i.e., the sum of the values or costs of the individual process instances) as a function of time. In this example, data is aggregated based on the week in which the process instances started.

A taxonomy is a user-defined way to classify instances of a process depending on its characteristics. Many taxonomies may be defined for the same process, and each taxonomy can have several categories. By construction, for each taxonomy, a process instance should fall within one and only one category at any given time. In some embodiments, however, if an instance belongs to more than one category, it is inserted in a special category "error," which is defined implicitly for each taxonomy. In addition, if it cannot be determined in which category a particular instance belongs, it is inserted in another special category "undefined," which also is defined implicitly for each taxonomy. Taxonomies can be defined by specifying the categories that compose the taxonomy. Each category is then associated to a behavior, with the meaning that the process instance is classified in a given taxonomy if the process instance has the corresponding behavior. Taxonomies are flat, that is, there is no hierarchy among categories.

Figure 11:
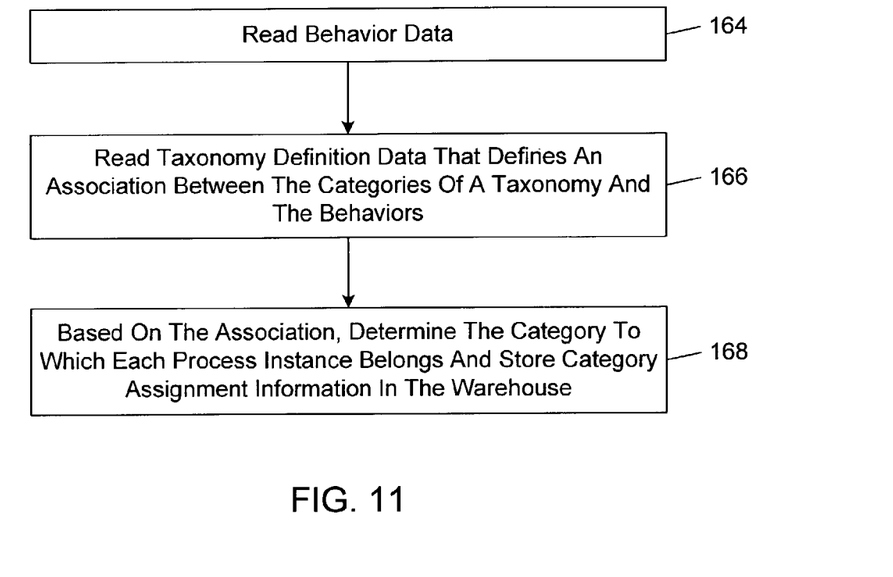
FIG. 11 is a flow diagram of a method of computing a taxonomy.

Referring to FIG. 11, in some embodiments, the process executed by the business operation intelligence engine 113 may compute a taxonomy as follows. The business operation intelligence engine reads the behavior data that is stored in the data warehouse (step 164). The business operation intelligence engine then reads the taxonomy definition data that defines an association between the categories of the taxonomy and the behaviors (step 166). Based on the associations, the business operation intelligence engine determines the category to which each process instance belongs and stores this category assignment information in the data warehouse (step 168).

Figure 12:
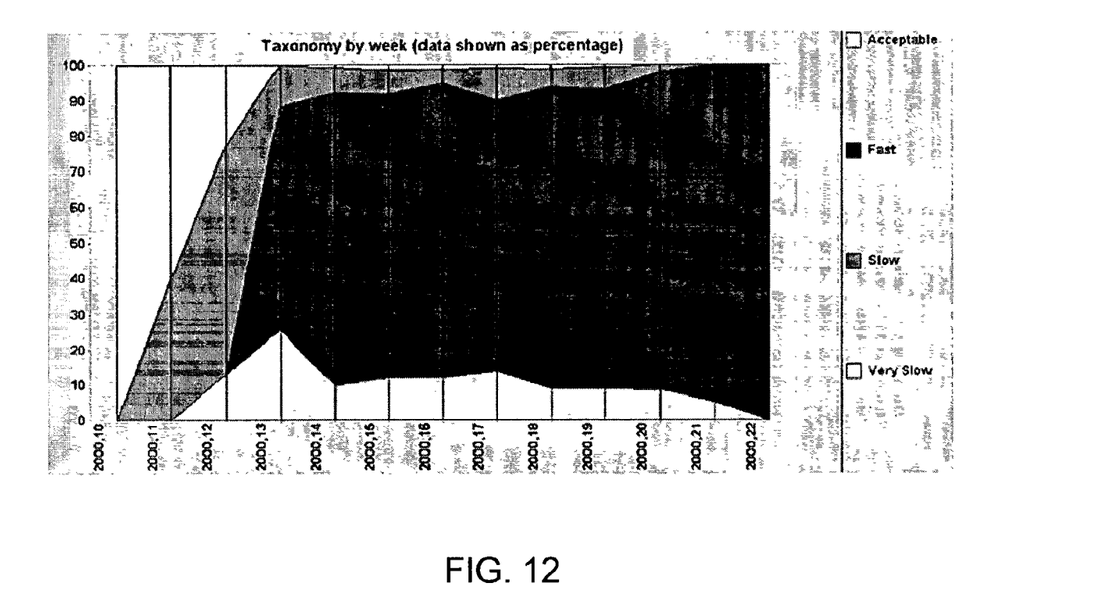
FIG. 12 is a graphical user interface visualizing total value of a process by week.

FIG. 12 illustrates the distribution of process instances within the categories of a "duration" taxonomy. In this example, for each week, the areas describe the percentage of instances started in the specified week that fall in each category of the taxonomy. As these examples show, by using taxonomies, business users may analyze the aspects of the process in which they are interested and organize reporting data as they see fit, avoiding focusing on details that may have little relevance to them.

Figure 13:
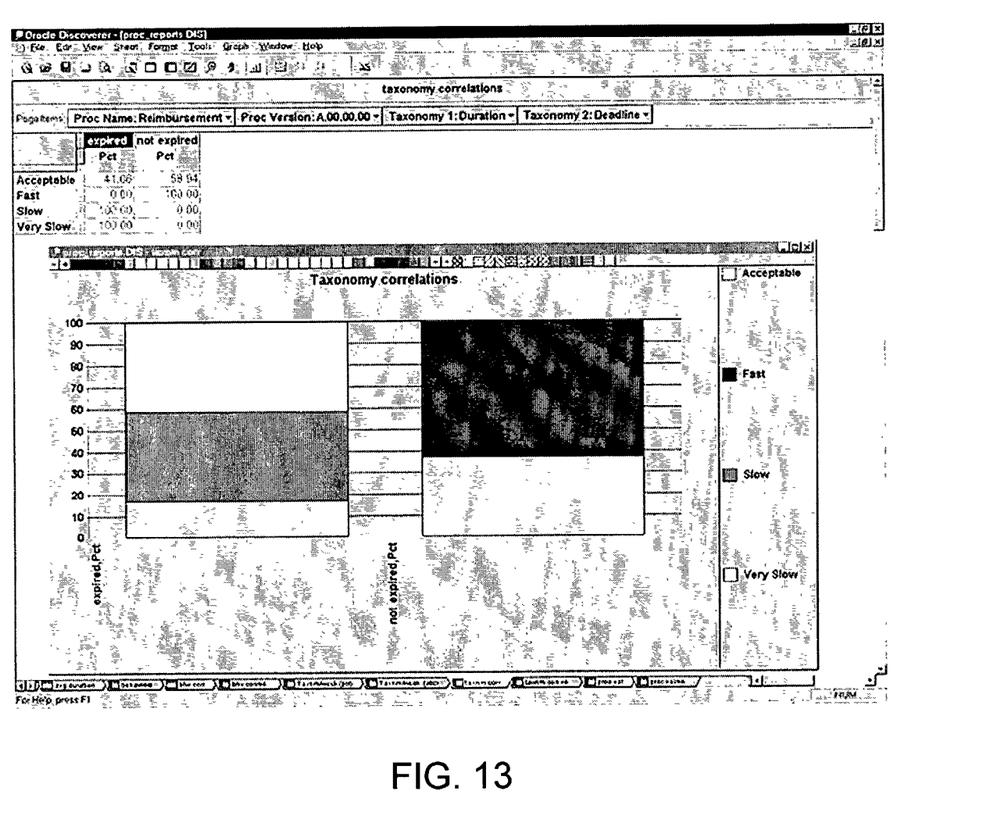
FIG. 13 is a graphical user interface visualizing correlations among categories of different taxonomies.

Analogously to behaviors, process data warehouse users also may examine correlations among categories of different taxonomies. This kind of analysis is very powerful, since it allows users to easily understand the cause-effect relationships among the categories of the two taxonomies. For example, FIG. 13 shows the correlation between the categories of taxonomies duration and deadline (that describes whether the deadline for node "approve" within process "reimbursement" has expired at least once in process instance execution). Users may examine the process performance distribution, depending on whether the deadline for the "approve" node has expired or not. The two bars in FIG. 13 correspond to instances that are in the categories "expired" (left) and "not expired" (right) of the deadline taxonomy. Each bar is then divided according to the percentage distribution of instances within the categories of the duration taxonomy. FIG. 13 shows, for instance, that less then half of the instances in which the node deadline expired are "very slow", while no instance is "very slow" if the deadline is "not expired."

It is noted that, while taxonomy correlations typically may produce reports that are at a higher level of abstraction with respect to behavior correlations (and therefore easier to interpret), taxonomy correlations do not replace behavior correlations. Indeed, users often may need to define behaviors that do not belong to specific taxonomies (possibly because they do not generate a partition in the process instance space), and to analyze correlation among these behaviors.

Behaviors and categories of a taxonomy can be associated to alerts, i.e., critical conditions to be monitored. The meaning is that, if a process instance is detected having a certain behavior (or belonging to a certain condition), an alert is triggered.

The systems and methods described herein are not limited to any particular hardware or software configuration, but rather they may be implemented in any computing or processing environment, including in digital electronic circuitry or in computer hardware, firmware or software. In general, the components of the business operation intelligence engine may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

What is claimed is:

1. A method of investigating a business process, comprising:
   accessing from a business process data warehouse execution data corresponding to data generated during execution of one or more instantiations of one or more business processes each involving a set of one or more activities each defined by a respective service and performed by a respective set of one or more resources;
   mapping the accessed execution data into one or more semantic concepts to obtain outcome data; and
   outputting a report visualizing the outcome data in terms of a user-selected perspective;
   wherein the accessing, the mapping, and the outputting are performed by a computer.

2. The method of claim 1, wherein the mapping comprises assigning nodes of the business process to nodes of a conceptualized definition of the business process.

3. The method of claim 2, wherein the conceptualized business process definition is user defined.

4. The method of claim 2, wherein the mapping comprises aggregating the accessed execution data corresponding to data generated at the business process nodes in accordance with the node assignments to obtain process region execution data for each of the nodes of the conceptualized business process definition.

5. The method of claim 4, wherein the outputting comprises summarizing the process region execution data in terms of a user-selected statistic.

6. The method of claim 1, wherein the mapping comprises classifying the accessed execution data in accordance with one or more behaviors to obtain behavioral outcome data.

7. The method of claim 6, wherein each of the behaviors comprises a behavior label and an associated condition on the process execution data.

8. The method of claim 7, wherein each of the one or more behaviors further comprises an associated value.

9. The method of claim 8, wherein the mapping comprises assigning values to behavioral outcome data.

10. The method of claim 6, wherein one or more of the behaviors are user defined.

11. The method of claim 6, wherein one or more of the behaviors are predefined.

12. The method of claim 6, wherein one or more of the behaviors correspond to alerts.

13. The method of claim 12, further comprising monitoring execution of one or more business processes, and visualizing outcome data comprises summarizing alert outcome data in terms of a selected statistic.

14. The method of claim 6, wherein the outputting comprises correlating the behavioral outcome data corresponding to different ones of the behaviors.

15. The method of claim 1, wherein the mapping comprises classifying the accessed execution data in accordance with one or more taxonomies to obtain taxonomic outcome data.

16. The method of claim 15, wherein each taxonomy comprises a set of categories each associated with a respective condition on the process execution data.

17. The method of claim 16, wherein each of the categories of one or more taxonomies is associated with a respective value.

18. The method of claim 17, wherein the mapping comprises assigning values to taxonomic outcome data.

19. The method of claim 15, wherein one or more taxonomies are user defined.

20. The method of claim 15, wherein one or more taxonomies are predefined.

21. The method of claim 15, wherein the outputting comprises correlating taxonomic outcome data corresponding to different taxonomies.

22. The method of claim 1, wherein the user-selected perspective is selected from: an aggregation of multiple business processes; a single business process; a business process node; a business process resource; a business process behavior; and time.

23. The method of claim 1, wherein the outcome data relates to one or more of process instance executions, node instance executions, and behaviors.

24. The method of claim 1, wherein the user-selected perspective is user-definable.

25. The method of claim 24, wherein the user-selected perspective is defined by a taxonomy comprising a set of one or more category labels each associated with a respective condition on the process execution data.

26. The method of claim 25, wherein at least one of the taxonomy conditions corresponds to one of: number of activations of a node; assignment of a node to an identified resource; duration of a node; duration of an identified business process; a value of data items at process instantiation time; a value of data items at completion time; and a value of data items after execution of a node.

27. The method of claim 1, further comprising building a process data warehouse from the outcome data.

28. The method of claim 27, wherein the process data warehouse is built based upon a star schema.

29. A system, comprising:
   computer hardware operable to perform operations comprising
      accessing from a business process data warehouse execution data corresponding to data generated during execution of one or more instantiations of one or more business processes each involving a set of one or more activities each defined by a respective service and performed by a respective set of one or more resources;
      mapping the accessed execution data into one or more semantic concepts to obtain outcome data; and
      visualizing the outcome data in terms of a user-selected perspective.

30. A computer-readable medium comprising computer-readable instructions that, when executed by a computer cause the computer to perform operations comprising:
   accessing from a business process data warehouse execution data corresponding to data generated during execution of one or more instantiations of one or more business processes each involving a set of one or more activities each defined by a respective service and performed by a respective set of one or more resources;

mapping the accessed execution data into one or more semantic concepts to obtain outcome data; and visualizing the outcome data in terms of a user-selected perspective.

31. The computer-readable medium of claim 30, wherein when executed by the computer the computer-readable instructions cause the computer to perform operations comprising assigning nodes of the business process to nodes of a conceptualized definition of the business process.

32. The computer-readable medium of claim 31, wherein when executed by the computer the computer-readable instructions cause the computer to perform operations comprising aggregating the accessed execution data generated at the business process nodes in accordance with the node assignments to obtain process region execution data for each of the nodes of the conceptualized business process definition.

33. The computer-readable medium of claim 30, wherein when executed by the computer the computer-readable instructions cause the computer to perform operations comprising classifying the accessed execution data in accordance with one or more behaviors to obtain behavioral outcome data.

34. The computer-readable medium of claim 30, wherein when executed by the computer the computer-readable instructions cause the computer to perform operations comprising classifying the accessed execution data in accordance with one or more taxonomies to obtain taxonomic outcome data.

35. The method of claim 1, wherein the accessing comprises operating on the execution data contained in a business process data warehouse.

36. The method of claim 1, wherein the mapping comprises:

identifying in a selected one of the business processes a subset of nodes within a process region defined by a starting one of the nodes and a set of one or more ending ones of the nodes, wherein the starting node and the set of one or more ending nodes represents a subgraph of the selected business process; and for each instance of the selected business process represented in the accessed execution data, determining the start and completion times of the nodes within the process region.

37. The method of claim 36, further comprising creating a new node corresponding to the process region, and storing the new node as part of the process execution data.

* * * * *

UNITED STATES PATENT AND TRADEMARK OFFICE
CERTIFICATE OF CORRECTION

PATENT NO.         : 7,644,006 B2                                              Page 1 of 1
APPLICATION NO.   : 10/200306
DATED              : January 5, 2010
INVENTOR(S)        : Fabio Casati et al.

It is certified that error appears in the above-identified patent and that said Letters Patent is hereby corrected as shown below:

Title Page, page 2, Item (56), under "U.S. Patent Documents", column 1, line 1, delete "8,631,362" and insert -- 6,631,362 --, therefor.

Signed and Sealed this

Thirteenth Day of July, 2010

David J. Kappos
*Director of the United States Patent and Trademark Office*